United States Patent [19]

Sawa et al.

[11] Patent Number: 5,656,344

[45] Date of Patent: Aug. 12, 1997

[54] ELECTROCONDUCTIVE POLYURETHANE FOAM

[75] Inventors: Eiji Sawa; Hiroya Fukuda; Shohei Morikawa; Hitoshi Yaguchi; Yuichiro Mori, all of Kanagawa-ken, Japan

[73] Assignee: Bridgestone Corporation, Tokyo, Japan

[21] Appl. No.: 205,337

[22] Filed: Mar. 3, 1994

Related U.S. Application Data

[62] Division of Ser. No. 28,033, Mar. 8, 1993, abandoned.

[30] Foreign Application Priority Data

| Mar. 9, 1992 | [JP] | Japan | 4-086008 |
| Jun. 29, 1992 | [JP] | Japan | 4-194989 |

[51] Int. Cl.$^6$ ................. B32B 1/00; C08J 9/00
[52] U.S. Cl. ............ 428/36.5; 428/304.4; 428/323; 428/423.1; 428/425.8; 428/425.9; 492/53; 492/59; 521/99; 521/133; 521/159; 252/500; 252/511
[58] Field of Search .................. 428/36.5, 423.1, 428/425.8, 425.9, 304.4, 323; 492/18, 53, 56, 59; 521/133, 159, 76, 99, 123; 252/502, 511, 512, 518, 500

[56] References Cited

U.S. PATENT DOCUMENTS

| 3,959,574 | 5/1976 | Seanor et al. | 428/425 |
| 4,301,040 | 11/1981 | Berbeco | 252/511 |
| 4,618,630 | 10/1986 | Knobel et al. | 521/105 |
| 4,806,571 | 2/1989 | Knobel et al. | 252/518 |
| 4,886,626 | 12/1989 | Cope et al. | 252/500 |
| 4,931,479 | 6/1990 | Morgan | 252/514 |
| 5,076,201 | 12/1991 | Nishio et al. | 118/653 |
| 5,082,870 | 1/1992 | Fukuda et al. | 521/159 |
| 5,096,934 | 3/1992 | Roberts et al. | 521/159 |
| 5,241,343 | 8/1993 | Nishio | 355/219 |
| 5,472,639 | 12/1995 | Yao | 252/500 |

FOREIGN PATENT DOCUMENTS

| 59-91133 | 5/1984 | Japan . |
| 60-118719 | 6/1985 | Japan . |
| 61-116707 | 6/1986 | Japan . |
| 61-166817 | 7/1986 | Japan . |
| 2-228357 | 9/1990 | Japan . |
| 4-138213 | 5/1992 | Japan . |
| 4-256985 | 9/1992 | Japan . |
| 4-256983 | 9/1992 | Japan . |
| 5-35110 | 2/1993 | Japan . |

*Primary Examiner*—Patrick Ryan
*Assistant Examiner*—Marie R. Yamnitzky
*Attorney, Agent, or Firm*—Jordan and Hamburg

[57] ABSTRACT

The electroconductive polyurethane foam according to the present invention is obtained by adding and dispersing, in the composition constituting polyurethane foam, a substance with electron conduction mechanism, and a substance with ionic conduction mechanism and mechanically agitating the resultant mixture in the presence of inert gas. The substance with ionic conduction mechanism is an antistatic agent selected from cationic surfactant, anionic surfactant, ampholytic surfactant, and non-ionic surfactant.

4 Claims, 6 Drawing Sheets

ELECTROCONDUCTIVE POLYURETHANE FOAM

This application is division of application Ser. No. 08/028,033, filed Mar. 8, 1993 (now abandoned).

BACKGROUND OF THE INVENTION

The present invention relates to electroconductive polyurethane foam suitable for use as a material for rollers which electrostatically control the object to be contacted, such as toner transfer rollers, charging rollers, development rollers, and cleaning rollers used in the printer for electrophotography and electrostatic recording systems.

In the case of prior art electrophotograpbic systems in which toner contained in the toner cartridge is supplied to a photosensitive member where electrostatic latent images are formed to thereby transfer and fix images on paper, the system comprises mechanisms such as for (1) electrification, (2) exposure, (3) development, (4) transfer, (5) fixation, and (6) diselectrification. Each mechanism includes various types of rollers for precise control of the static electricity. Quality requirements for materials of such rollers are increasingly rigorous in recent years.

As rollers used in the development mechanism such as toner transfer rollers, electrified rollers, development rollers, transfer rollers, and rollers used in the cleaning mechanism function to electrically control the object to be contacted, electroconductivity of their material must be stable against changes in the environmental conditions. For example, fluctuation in the resistance should remain within the range of one digit order, e.g. between $1\times10^8$ Ω-cm and $1\times10^9$ Ω-cm, when the ambient conditions are between 5° C. at 30% relative humidity and 30° C. at 85% relative humidity.

Flexible polyurethane foam is usually used as the material for such rollers as these rollers should not damage the precision parts such as the photosensitive drum when contacted, or as the contact surface of the rollers must be increased for secure gripping. Moreover, because electrostatic control operation by these rollers is usually carried out in a very limited area, cell size of such polyurethane foam is required to be very fine.

As an electroconductive polyurethane foam useful as the material for such rollers, the following materials have been known in the art:

(1) polyurethane foam obtained by blending electroconductive carbon with a mixture of polyol, isocyanate, catalyst, water and foaming agent such as fluorocarbon, (2) polyurethane foam obtained as (1) above and added with ionic antistatic agent, and (3) polyurethane foam impregnated with carbon paint, etc.

With the conventional polyurethane obtained as (1) above, a larger amount of carbon addition is necessary to increase the conductivity (volume resistivity of $1\times10^9$ Ω-cm or lower). This increases the viscosity of the system and results in uneven mixing of carbon with other components, thus making it difficult to obtain fine and uniform cells in the conductive polyurethane foam. Since very subtle difference in the carbon addition results in an extremely large difference in the conductivity, to control the conductivity at $1\times10^8$ Ω-cm or higher in terms of volume resistivity, accurate control of the conductivity was difficult. Further, the conductivity (resistivity) of the resultant polyurethane foam is highly dependent on the environment.

Polyurethane obtained in (2) above is defective in that its conductivity (resistivity) is particularly dependent on the environment.

Polyurethane obtained in (3) above is defective in that in order to impregnate the carbon dispersion into the polyurethane foam, cells in the foam must be relatively large. If the cells are small, carbon particles will not penetrate into the foam (as the foam acts as a filter), and the conductivity will become uneven.

SUMMARY OF THE INVENTION

The present invention aims at providing electroconductive polyurethane foam with fine and uniform cells and conductivity which is relatively stable against changes in the environment.

To achieve this object, starting materials for polyurethane foam are mixed and dispersed with substances having electron conduction mechanism and substances having ionic conduction mechanism, and then the mixture is mechanically agitated with inert gas to foam.

The conductive polyurethane foam according to the present invention has a lower resistivity even when the addition of fine conductive powder such as carbon is smaller than that used in the prior art because of its ion conductive mechanism. Fine cells with uniform diameter distribution can also be obtained because of low viscosity of the system at the time of foaming. It is possible to obtain conductivity in the range of from $1\times10^{11}$ Ω-cm to $1\times10^6$ Ω-cm with less dependence on the environment (in the order of one digit at 5° C.× relative humidity 30% to 30° C.× relative humidity 85%, e.g. in the range of from $1\times10^8$ Ω-cm to $1\times10^9$ Ω-cm).

DETAILED DESCRIPTION OF THE PREFERRED EMBODIMENTS

Figure 1:
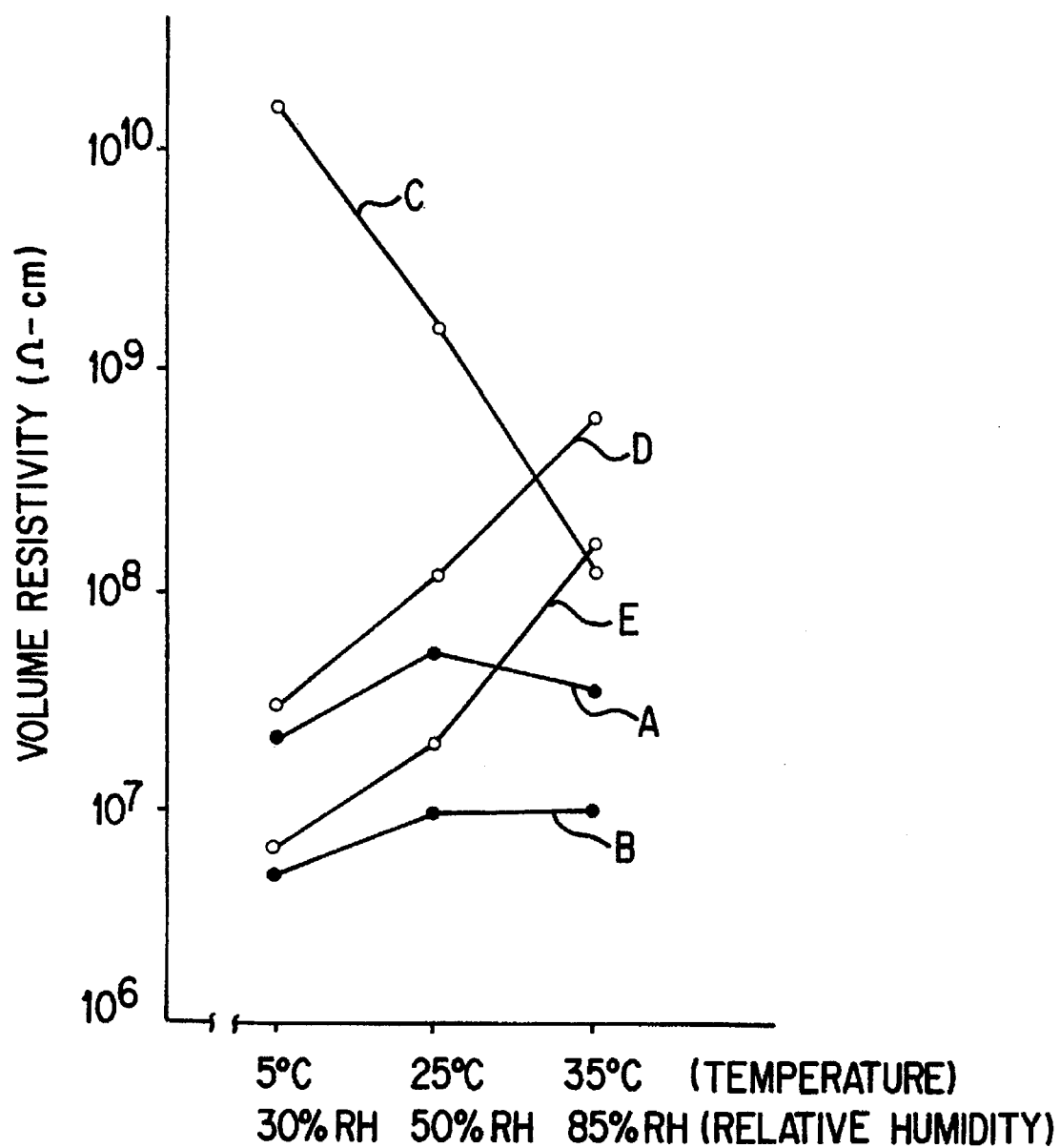
FIG. 1 is a graph to show Example 1 of the present invention and a comparative Example which only contains conductive carbon powder as relative to temperature, humidity (relative humidity) and volume resistivity.

The present invention will now be described by way of preferred examples.

As a resin to form polyurethane foam, a mixture containing polyhydroxyl compound, organic polyisocyanate compound, catalyst, foam stabilizer and other additives is used. The mixture is further added and dispersed with a substance with an electron conduction mechanism such as carbon, a substance selected from among metal salts such as lithium, sodium and potassium and complex thereof, or metal salts of calcium and barium and complex thereof, and/or a substance with ionic conduction mechanism selected from among antistatic agent such as cationic surfactant, anioic surfactant, ampholytic surfactant, and non-ionic surfactant. The mixture is then mechanically agitated with inert gas to cause the gas to be uniformly distributed in the system for stable foaming. The foamed system is cured by heating.

Polyhydroxyl compounds to be used in the present invention include polyol, i.e. polyether polyol and polyester polyol terminated with hydroxyl group, as well as polyether polyesterpolyol which is a copolymer of the first two compounds: they are generally used for the production of soft polyurethane foam and urethane elastomer. So-called common polymer polyols that are obtained by polymerizing unsaturated ethylchic monomers in polyol can also be used. As a polyisocyanate compound, polyisocyanates commonly used for the production of soft polyurethane foam and urethane elastomer can be used. They include tolylene diisocyanate (TDI), crude TDI, 4, 4'-diphenylmethane diisocyanate (MDI), crude MDI, aliphatic polyisocyanates having 2 to 18 carbon atoms, aliphatic polyisocyanates having 4 to 15 carbon atoms, aromatic polyisocyanates having 8 to 15 carbon atoms, mixtures and modified compounds of such polyisocyanates such as prepolymers that are obtained by partially reacting polyisocyanates with polyol. Catalysts to be used in the present invention include commonly known organic metal compounds such as dibutyltin dilaurate, tin octylate and zinc octylate, alkali and alkaline earth metals such as alkoxide and phenoxide, tertiary amines such as triethylamine, triethyldiamine, N-methyl morpholine and dimethylaminomethyl phenol, quaternary ammonium compounds, and imidazoles. Nickel acetyl acetonate and diacetyl acetonate nickel may also be used. Any known foam surfactant for foaming polyurethane may be used without restrictions. Other additives that may be used when and if necessary include those generally used for the production of urethane foam such as pigments, dyes, and organic or inorganic fillers.

Particulate or fibrous substances having electron conduction mechanism may be used to give electroconductive product such as powder or chopped fiber strands of conductive carbon or graphite, powder or fibrous product of conductive metals such as copper, nickel and silver, metal oxides such as tin oxide, titanium oxide and indium oxide, various fillers plated with metal for conductivity, and electroconductive organic fine powders such as powder of polyacetylene, polyprrole and polyaniline.

Substances with ionic conduction mechanism to impart electroconductivity to the product include $LiCF_3$, $SO_3$, $NaCl_4$, $LiClO_4$, $LiAsF_6$, $LiBF_4$, NaSCN, KSCN and NaCl that are the metallic salts of $Li^+$, $Na^+$ and $K^+$ in Group I of the periodic table, electrolytes of salts such as $NH_4^+$, metallic salts of $Ca^{++}$, $Ba^{++}$, etc. in Group II of the periodic table such as $Ca(ClO_4)$, complexes of the metallic salts with polyhydric alcohols and their derivatives such as 1,4 butanediol, ethylene glycol, propylene glycol and polyethylene glycol, and complexes of metallic salts with mono-ols such as ethylene glycol monomethyl ether and ethylene glycol monoethyl ether.

EXAMPLE 1

100 parts of polyether polyol (OH Value: 33) (EXCENOL (registered trademark) 828 by Asahi Glass Company) having the molecular weight of 5000 and obtained by adding propylene oxide and ethylene oxide to glycerin;
17.5 parts of urethane modified MDI (SUMIDUR (registered trademark) PF by Sumitomo Bayer Urethane Co., Ltd.), NCO %=23%;
1.0 part of 1,4-butanediol;
1.5 parts of silicon surfactant (L-520 by Nippon Unicar Co., Ltd.);
0.01 part of dibutyltin dilaurate;
1 to 2 parts of conductive carbon (Denka Black by Denki Kagaku Kogyo KK);
0.5 part of complex of $LiClO_4$ and $CH_3OCH_2CH_2OCH_2CH_2OH$ (MP-100-A by Akishima Chemical Industries Co., ltd.).

These materials were charged in a 1-liter plastic container and agitated for 2 minutes using a hand mixer to obtain a foamed product with minute and uniform cells.

Figure 6:
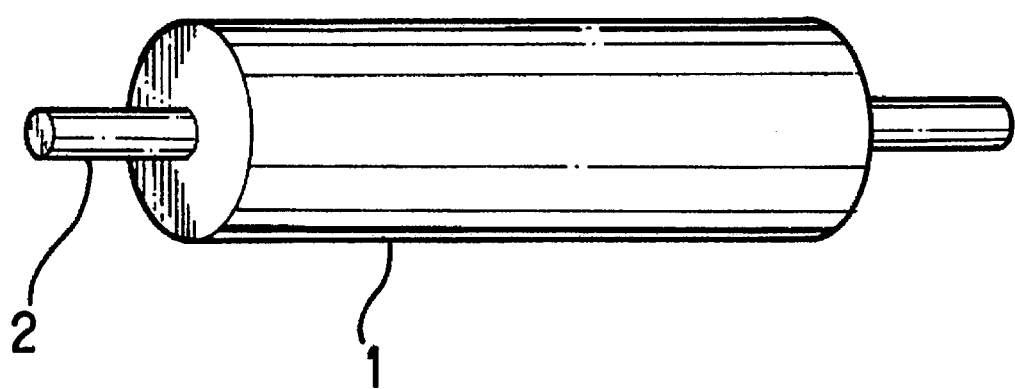
FIG. 6 is a perspective view of a roller.

The foamed product was then poured into a mold measuring 100 mm×100 mm×50 mm (depth), heated and cured at 140° C. for 7 minutes, and then cut into slices to measure the cell diameter, conductivity, etc. The foamed product had uniform cells with the density of 0.52 g/cm³ and cell diameter of 200 µm or less. Volume resistivity of the product cut into a 2 mm-thick slice was measured by using resistivity cells, i.e. Resistance Meters 4329A and 16008A by Yokogawa Hewlett-Packard, Ltd and in accordance with JIS-K6911. In the graph of FIG. 1, the symbol A represents a foamed product of Example 1 containing 1 part of conductive carbon and 0.5 part of $LiClO_4$ complex (MP-100-A). The symbol B is a foamed product containing 2 parts of conductive carbon and 1 part of $LiClO_4$. The symbols C through E denote those containing only conductive carbon at 0.5, 1 and 2 part(s) respectively. The environment dependence of conductivity of the foamed products was investigated. As shown in FIG. 1, foamed products containing conductive carbon alone (C through E) showed dependence on the environment. The addition of a $LiClO_4$ complex (A, B) decreased dependence of conductivity on the environment. Resistance was also found to decrease when $LiClO_4$ complex was added as compared with the products containing conductive carbon alone, showing that the carbon addition could be substantially reduced to obtain comparable resistance (reduced viscosity of the system facilitated foaming). A roller having the structure shown in FIG. 6 was made using the polyurethane foam of Example 1 and was used as a transfer roller. Uniform images were obtained. Excellent images were also obtained when the roller was used as the charging roller. In FIG. 6, the reference number 1 denotes conductive polyurethane foam and 2 denotes a metal shaft.

Comparative Example 1

Polyurethane foam obtained by adding 0.5 to 2 parts of carbon alone without the addition of the $LiClO_4$ complex and had a density of 0.52 g/cm³. Polyurethane foam added with 2 parts of carbon was particularly coarse, with a mean cell diameter of 500 µm and showed higher environment dependence of conductivity.

EXAMPLE 2

100 parts of polyether polyol (OH value: 33) (EXCENOL (registered trademark) 828 by Asahi Glass Company) having the molecular weight of 5000 obtained by adding propylene oxide and ethylene oxide to glycerin;
25.0 parts of urethane modified MDI (SUMIDUR (registered trademark) PF by Sumitomo Bayer Urethane Co., Ltd.), NCO%=23%;
2.5 parts of 1,4-butanediol
1.5 parts of silicon surfactant (L-520 by Nippon Unicar Co., Ltd.);
0.01 part of dibutyltin dilaurate;
10 to 60 parts of fine graphite powder (electron conductive substance) (AUP by Nippon Kokuen, LTD)

1 to 2 part(s) of complex of $Ca(ClO_4)_2$ and $CH_3OCH_2CH_2OCH_2CH_2OH$ (with $Ca(ClO_4)_2$ at 35 wt %) (diethylene glycol monomethyl ether) (MP-100-E by Akishima Chemical Industries Co., Ltd.);

The product "AUP" by Nippon Kokuen Ltd contains 99% of solid carbon and 1% of ash with the mean diameter of 0.7 μm.

Figure 2:
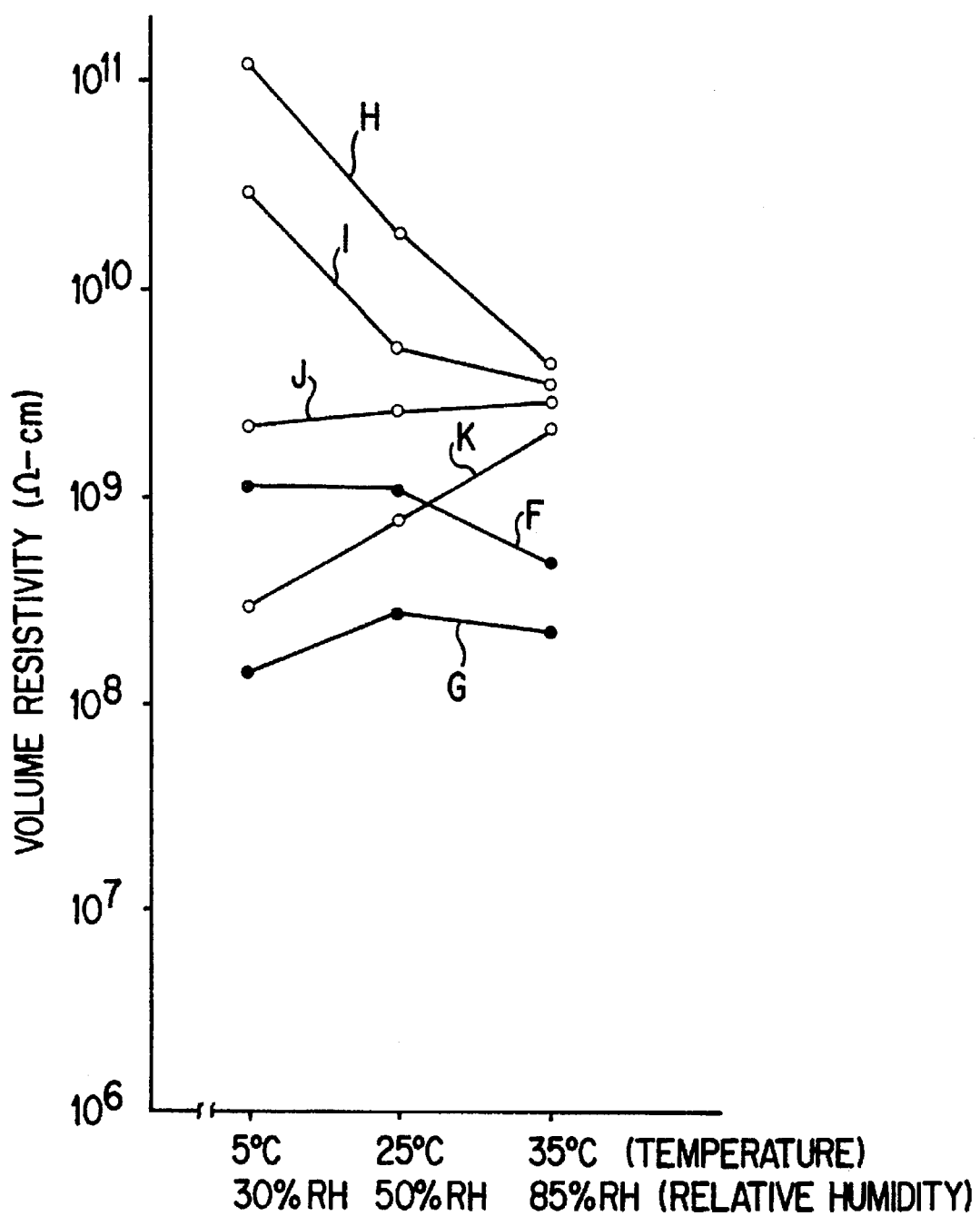
FIG. 2 is a graph similar to FIG. 1 showing Example 2 of the present invention and a comparative example which only contains graphite.

These starting materials were foamed similarly to Example 1, and the electro-conductivity (volume resistivity) of the resultant product was measured. As shown in FIG. 2, the systems with the additional of graphite alone (H through K) with lower resistivity always show higher dependence on the environment at certain resistivity values except for one system (graphite 30 parts). The symbol F in FIG. 2 denotes a system according to Example 2 comprising 30 parts of fine graphite powder, and one part of complex (MP-100-E) of $Ca(ClO_4)_2$, and the symbol G a system comprising 60 parts and 2 parts respectively of said materials. The symbol H through K denote systems where fine graphite powder alone is added at 10, 15, 30 and 60 parts respectively.

It was revealed that a combined use of a $Ca(ClO_4)_2$ complex resulted in systems (F, G) with volume resistivity less dependent on the ambient temperature.

Comparative Example 2

Figure 3:
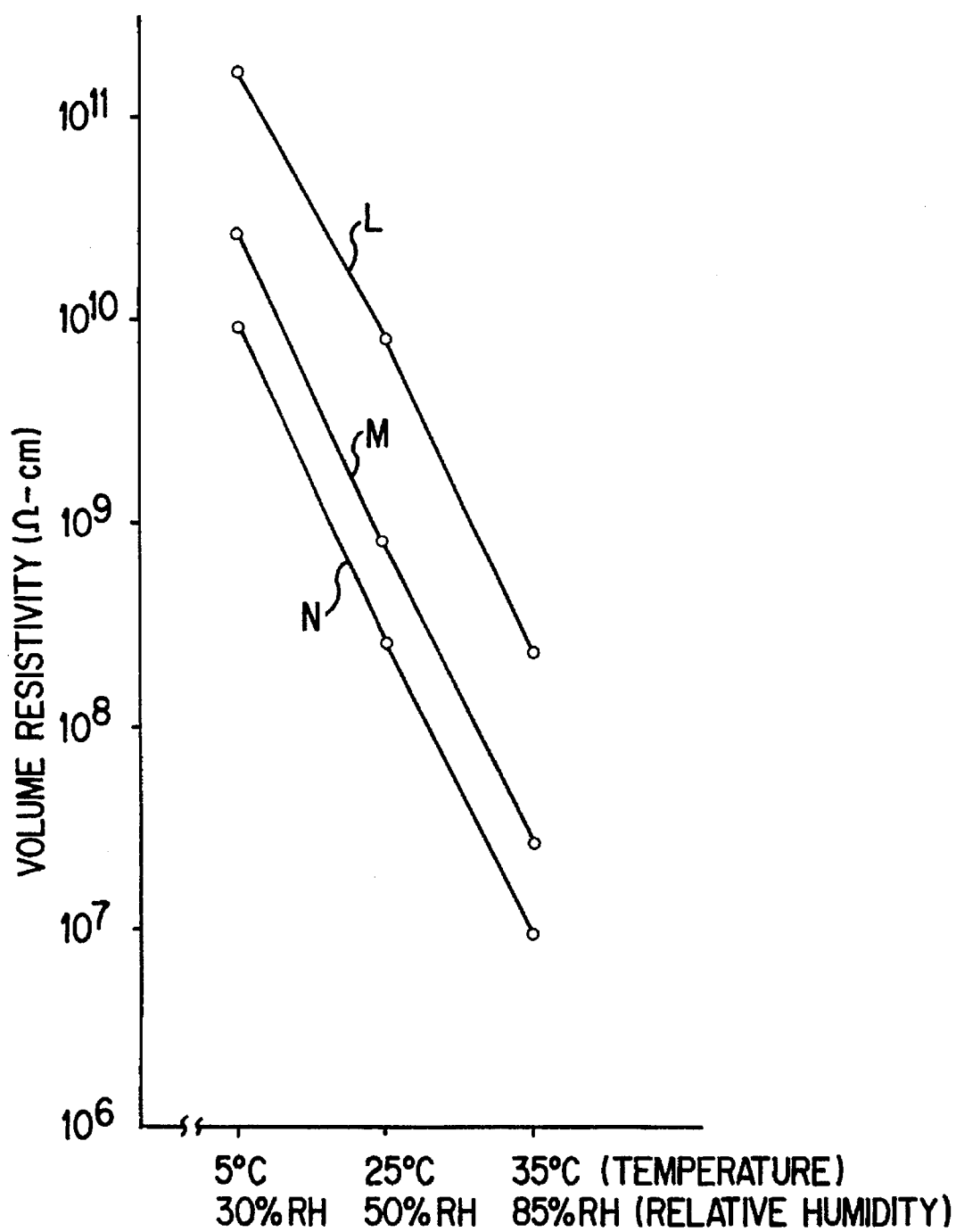
FIG. 3 is a graph similar to FIG. 1 showing a polyurethane foam containing MP-100-A alone as a substance with ionic conduction mechanism and a polyurethane foam containing no such substance.

Although systems that contained added $LiClO_4$ complex alone but not conductive carbon according to Example 1 resulted in excellent foams with fine and uniform cells, their environment dependence of conductivity (volume resistivity) was highly significant, and the tendency remained unchanged despite changes in the amount of addition (FIG. 3). The reference L in the graph of FIG. 3 represents a system where no substances with electron or ionic conduction mechanism are added. System M contains added 0.5 part of MP-100-A alone, and N is a system added with 1.0 part of MP-100-A alone.

Polyurethane foam according to the present invention has both electron and ionic conduction mechanisms with relatively high stability against changes in the environment. Mechanical agitation employed in the present invention also produces cells that are fine and uniform in size.

In addition to substances which impart conductivity to the products by the ionic conduction mechanism mentioned above, there are commonly used antistatic agents selected from cationic surfactant such as quaternary ammonium compounds, artionic surfactant such as aliphatic sulfonate ($RSO_3Na$), higher alkyl sulfate ($ROSO_3Na$), higher alkyl ether sulfate ($RO(CH_2CH_2O)_mSO_3Na$), higher alkyl phosphate($ROPO_3Na_2$), and higher alkyl ether phosphate ($RO(CH_2CH_2O)_mPO_3Na_2$), ampholytic surfactant such as betaine, non-ionic surfactant such as higher alcohol ethylene oxide, polyethylene glycol fatty acid ester, and polyvalent alcohol fatty acid ester, such antistatic agents having a group with at least one active hydrogen atom which reacts with isocyanate such as hydroxyl group, carboxyl group, primary or secondary amine group. The conductive substances mentioned above can also be used.

EXAMPLE 3

100 parts of polyether polyol (OH value: 33) with the molecular weight of 5000 obtained by adding propylene oxide and ethylene oxide to glycerin (EXCENOL 828 (registered trademark) by Asahi Glass Company);

20.0 parts of urethane modified MDI (SUMIDUR PF (registered trademark) by Sumitomo Bayer Urethane Co., Ltd.) NCO %=23%;

1.5 parts of 1,4-butanediol;

1.5 parts of silicon surfactant (L-520 by Nippon Unicar Co., Ltd);

0.01 part of dibutyltin dilaurate;

1 part of conductive carbon (Denka Black by Denki Kagaku Kogyo KK);

20 parts of quaternary ammonium compound with ionic conduction machanism as an antistatic agent for urethane (LAROSTAT 377 DPG by jordan Chemical);

These starting materials were charged in a 1-liter container and agitated for 2 minutes using a hand mixer to obtain a foamed product with minute and uniform cells. The foamed product was poured into a mold measuring 100 mm×100 mm×50 mm, heated and cured at 140° C. for 7 minutes to obtain conductive polyurethane foam. The conductive polyurethane foam thus obtained was used to prepare a roller as shown in FIG. 6, which was in turn used as a transfer roller. Uniform images were obtained. Excellent images were similarly obtained when the roller was used as the charging roller. It is also possible to combine 10 parts of quaternary ammonium compound and 0.05 part of a complex comprising calcium perchlorite $Ca(ClO_4)$ and diethylene glycol monomethyl ether as a substance with ionic conduction mechanism.

Figure 4:
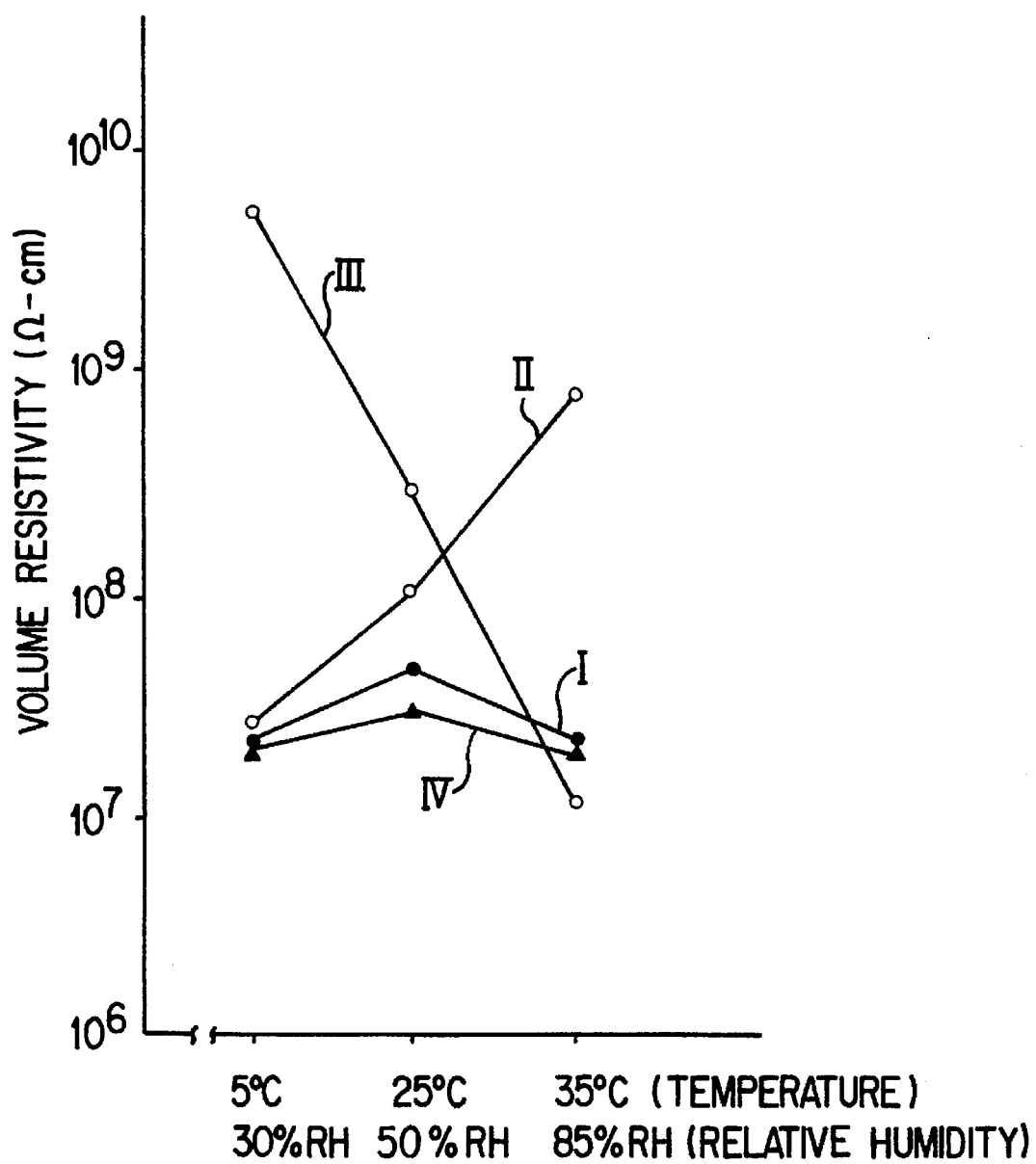
FIG. 4 is a graph to show Example 3 of the present invention, a polyurethane foam which contains only conductive carbon powder and a polyurethane foam which only contains quaternary ammonium compound as relative to temperature, humidity (relative humidity) and volume resistivity.

The foamed product after curing had uniform cells at the density of 0.52 g/cm³ and cell diameter of 200 μm. Volume resistivity of the product sliced into 2 mm thick sheets was measured by using resistivity cells, i.e. High Resistance Meters 4329A and 16008A by Yokogawa Hewlett-Packard and in accordance with JIS-K6911. In the graph of FIG. 4, the reference II denotes a foamed product with conductive carbon addition (1 part) alone. The reference III denotes a foamed product containing quaternary ammonium compound alone. It contains 20 parts of LAROSTAT 377DPG. The foamed product IV contains 1 part of conductive carbon, 10 parts of LAROSTAT and 0.05 part of MP-100-E as substances with ionic conduction mechanism. Environment dependence of conductivity was investigated with respect to these foamed products. As shown in FIG. 4, those products added with carbon alone (product II) and with quaternary ammonium compound alone (product III) showed higher dependence, whereas combined use of carbon and quaternary ammonium compound (product I) could reduce dependence of conductivity on environment significantly.

In a much wider temperature range except at low temperatures, the foamed products according to the present invention showed a lower resistance than the product with carbon addition alone if the amount of carbon addition was the same.

EXAMPLE 4

100 parts of polyether polyol (OH value: 33) with the molecular weight of 5000 obtained by adding propylene oxide and ethylene oxide to glycerin (EXCENOL 828 (registered trademark) by Asahi Glass Co.);

20.0 parts of urethane modified (SUMIDUR PF (registered trademark) by Sumitomo Bayer Urethane Co., Ltd);

1.5 parts of 1,4-butanediol;

1.5 parts of silicon surfactant (L-520 by Nippon Unicar Co., Ltd);

0.01 part of dibutyltin dilaurate;

2 parts of conductive carbon (Denka Black by Denki Kagaku Kogyo KK);

15 parts of non-ionic antistatic agent for urethane having OH group reactive with organic polyisocyanate as a substance with ionic conduction mechanism (STATURE by Dow Chemical Japan Ltd).

These materials were foamed similarly to Example 3 to obtain conductive polyurethane foam.

Figure 5:
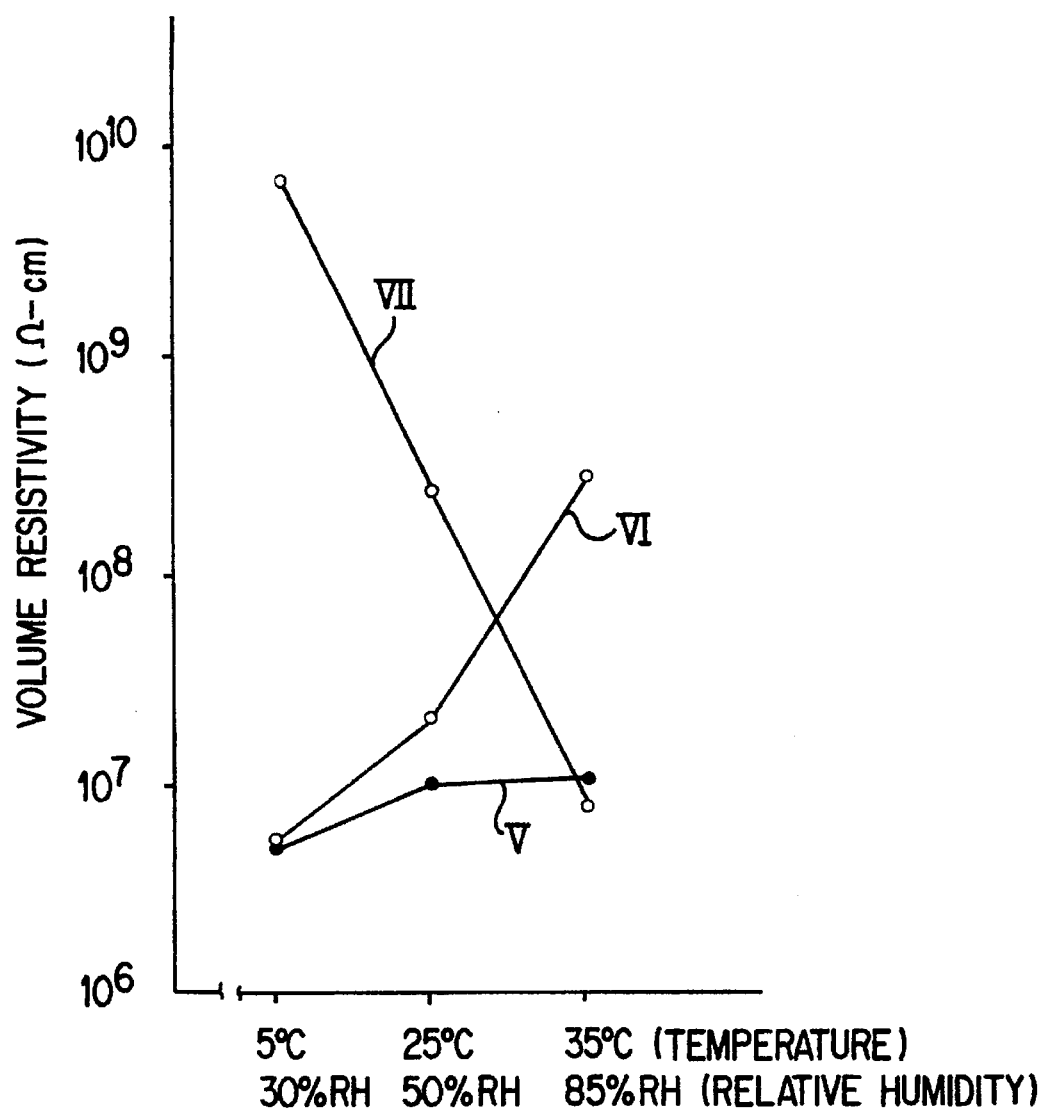
FIG. 5 is a graph to show Example 4 of the present invention, polyurethane foam which contains only conductive carbon powder and polyurethane foam which only contains a non-ionic antistatic agent as relative to temperature, humidity (relative humidity) and volume resistivity.

In the graph of FIG. 5, the reference V denotes a product which contains 2 parts of conductive carbon given in Example 4 and 15 parts of non-ionic antistatic agent (STATURE). The product VI is added with 2 parts of conductive carbon alone. The product VII contains 15 parts of STATURE alone as the non-ionic antistatic agent. Environment dependence of conductivity was investigated. As shown in FIG. 5, products having either carbon (VI) or non-ionic antistatic agent (VII) alone respectively showed higher environment dependence, whereas the products having both carbon and non-ionic antistatic agent showed a decrease in environment dependence.

Conductive polyurethane foams according to the present invention not only show electron conduction machanisms and ionic conduction machanisms, but are highly stable against environmental changes. Moreover, mechanical agitation employed in the present invention produces fine and uniform cells.

What is claimed is:

1. In a roller for a printer of an electrophotographic or electrostatic recording apparatus, the improvement comprising a surface of the roller being comprised of an electroconductive polyurethane foam, said foam comprising a substance with an electron conduction mechanism selected from the group consisting of a carbon- or graphite-base powder, carbon- or graphite-base fibrous substance, a conductive metal powder or fibrous substance of copper, nickel or silver, a powder or fibrous substance of a metal oxide, a conductive substance obtained by metal-plating fillers and a powder or a fibrous organic substance selected from the group consisting of polyacetylene, polypyrrole and polyaniline; and a substance with an ionic conduction mechanism selected from the group consisting of metal salts, antistatic agents, complexes of metal salts with mono-ols, complexes of metal salts with polyhydric alcohols and complexes of metal salts with derivatives of said polyhydric alcohols, said electroconductive polyurethane foam having a volume resistivity in a range of $1 \times 10^6 - 1 \times 10^{11}$ Ω-cm, and a change in a volume resistivity of said polyurethane foam being no greater than one order of magnitude for a range of ambient conditions from about 5° C., 30% relative humidity to about 35° C., 85% relative humidity.

2. The roller of claim 1, wherein the metal oxide is selected from the group consisting of tin oxide, titanium oxide and indium oxide; the metal salts are selected from the group consisting of salts of lithium, sodium, potassium, calcium, barium and mixtures thereof; the antistatic agents are selected from the group consisting of cationic surfactants, anionic surfactants ampholytic surfactants, non-ionic surfactants and mixtures thereof; the complexes of metal salts with mono-ols are selected from the group consisting of ethylene glycol monomethyl ether and ethylene glycol monoethyl ether; and the polyhydric alcohols complexed with metal salts are selected from the group consisting of 1,4-butanediol, ethylene glycol, polyethylene glycol, propylene glycol, and derivatives thereof.

3. In a method for preparing an electroconductive polyurethane foam for a roller for a printer of an electrophotographic or electrostatic recording apparatus, the improvement comprising dispersing a substance with an electron conduction mechanism and a substance with an ionic conduction mechanism in said polyurethane foam for making said polyurethane foam electroconductive, said substance with an electron conduction mechanism being selected from the group consisting of a carbon- or graphite-base powder, carbon- or graphite-base fibrous substance, a conductive metal powder or fibrous substance of copper, nickel or silver, a powder or fibrous substance of a metal oxide, a conductive substance obtained by metal-plating fillers and a powder or a fibrous organic substance selected from the group consisting of polyacetylene, polypyrrole and polyanilins; said substance with an ionic conduction mechanism being selected from the group consisting of metal salts, antistatic agents, complexes of metal salts with mono-ols, complexes of metal salts with polyhydric alcohols and complexes of metal salts with derivatives of said polyhydric alcohols, said electroconductive polyurethane foam having a volume resistivity in a range of $1 \times 10^6 - 1 \times 10^{11}$ Ω-cm, and a change in a volume reistivity of said polyurethane foam being no greater than one order of magnitude for a range of ambient conditions from about 5° C., 30% relative humidity to about 35° C., 85% relative humidity; and agitating said electroconductive polyurethane foam while contacting said electroconductive polyurethane foam with an inert gas.

4. The method of claim 2, wherein the metal oxide is selected from the group consisting of tin oxide, titanium oxide and indium oxide; the metal salts are selected from the group consisting of salt of lithium, sodium, potassium, calcium, barium and mixtures thereof; the antistatic agents are selected from the group consisting of cationic surfactants, anionic suffactants, ampholytic surfactants, non-ionic surfactants and mixtures thereof; the complexes of met salts with mono-ols are selected from the group consisting of ethylene glycol monomethyl ether and ethylene glycol monoethyl ether and the polyhydric alcohols come with metal salts are selected from the group consisting of 1,4-butanediol, ethene glycol, polyethylene glycol, propylene glycol, and derivatives thereof.

* * * * *